United States Patent [19]
Abdelmoula

[11] Patent Number: 5,906,141
[45] Date of Patent: May 25, 1999

[54] LOCKING DEVICE FOR THE ANGULAR POSITION OF A CONTROL KNOB

[75] Inventor: Foued Abdelmoula, Rouen, France

[73] Assignee: Dosapro-Milton Roy S.A., France

[21] Appl. No.: 08/806,951

[22] Filed: Feb. 26, 1997

[30] Foreign Application Priority Data

Feb. 28, 1996 [FR] France ................................. 96 02458

[51] Int. Cl.⁶ .................................................. G05G 1/10
[52] U.S. Cl. .............................................. 74/553; 74/527
[58] Field of Search ........................ 74/553, 527, 10.41, 74/89.15

[56] References Cited

U.S. PATENT DOCUMENTS

| | | | |
|---|---|---|---|
| 2,833,158 | 5/1958 | Damon | 74/504 |
| 3,707,204 | 12/1972 | Dussardier | 184/55 A |
| 4,453,434 | 6/1984 | Lissy | 81/57.29 |
| 4,619,288 | 10/1986 | McPherson | 137/554 |
| 4,991,461 | 2/1991 | Sennett et al. | 74/553 |
| 5,381,636 | 1/1995 | Kassardjian et al. | 52/301 |
| 5,537,893 | 7/1996 | Snider | 74/553 |

FOREIGN PATENT DOCUMENTS

| | | | |
|---|---|---|---|
| 0 271 981 A2 | 6/1988 | European Pat. Off. | 74/553 |
| 2284923 | 4/1976 | France | 74/553 |
| 2 627 822 | 9/1989 | France . | |
| 3120014 A1 | 12/1982 | Germany | 74/553 |
| 3637451 A1 | 5/1988 | Germany | 74/553 |
| 2 000 837 | 1/1979 | United Kingdom . | |
| 2253898 | 9/1992 | United Kingdom | 74/553 |

*Primary Examiner*—Vinh T. Luong
*Attorney, Agent, or Firm*—Kristin L. Chapman

[57] ABSTRACT

The device permits locking of a control knob which can rotate around a cylindrical support and includes a lateral face with at least one first locking boss and a lateral face of a ring which has at least one second locking boss. The ring is movable in translation according to the axis between a locked position of the knob, in which the ring is prevented from rotating around the axis when the first and second bosses are engaged, and between a released position in which the first and second bosses are decoupled.

8 Claims, 3 Drawing Sheets

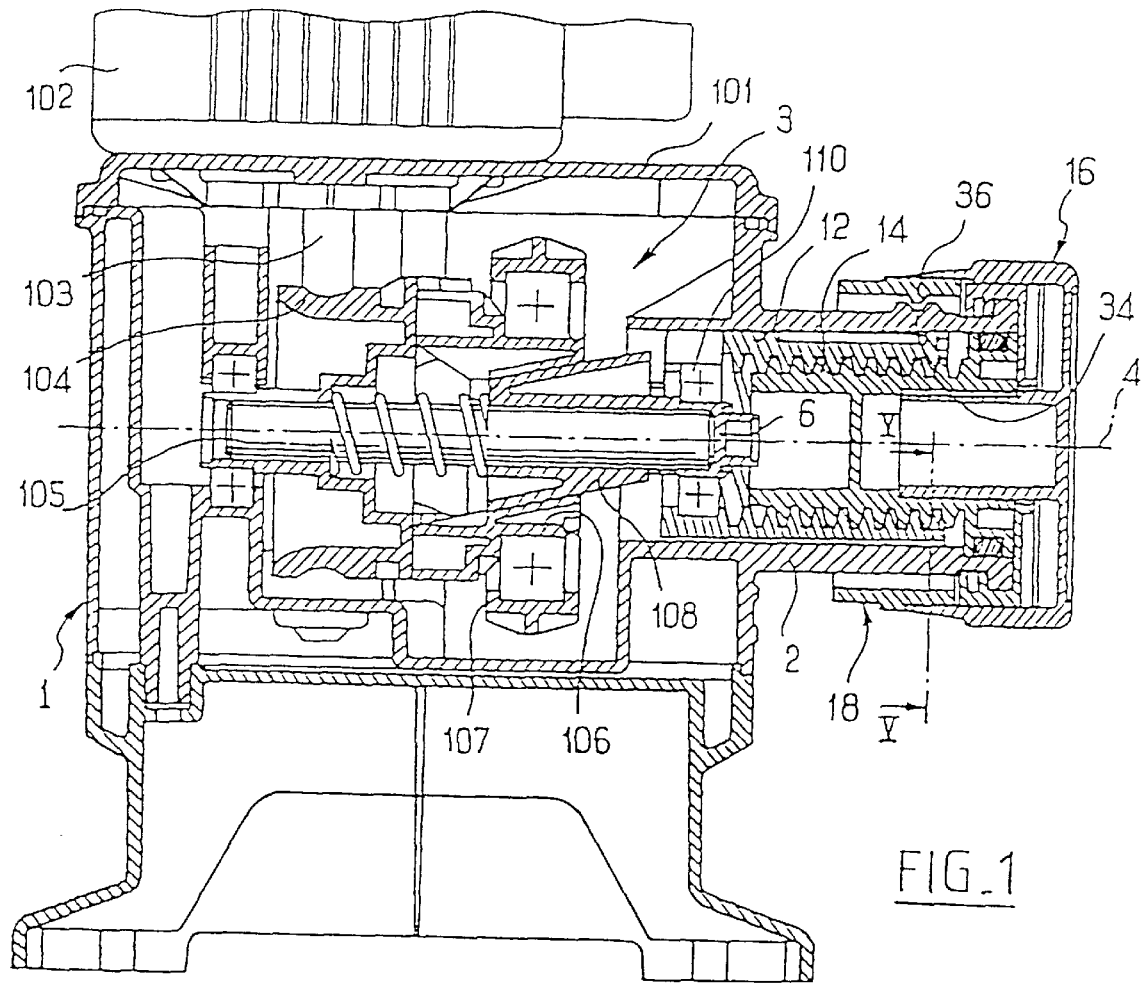
FIG_1
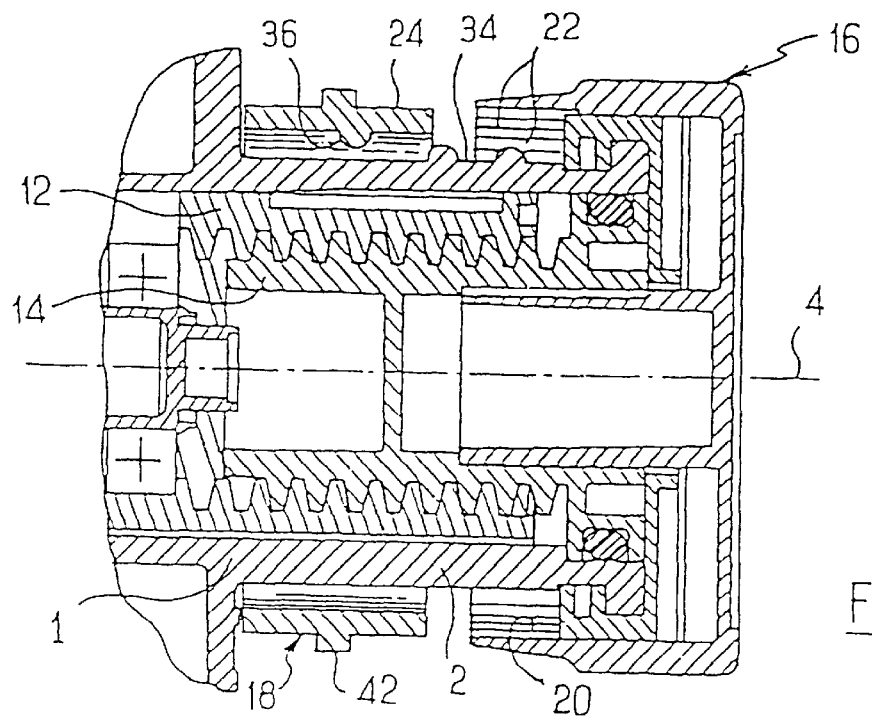
FIG_2

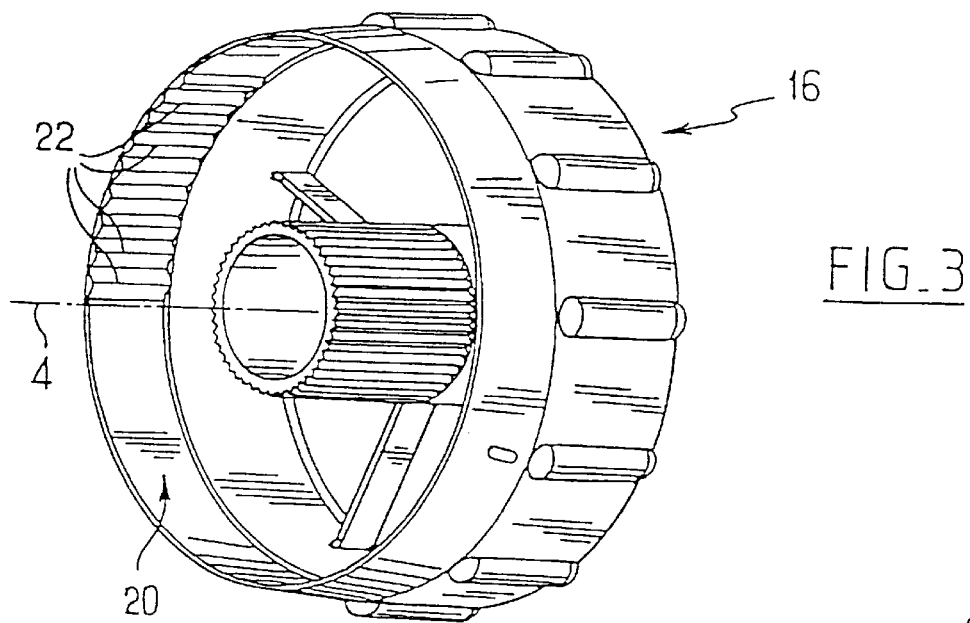
FIG_3
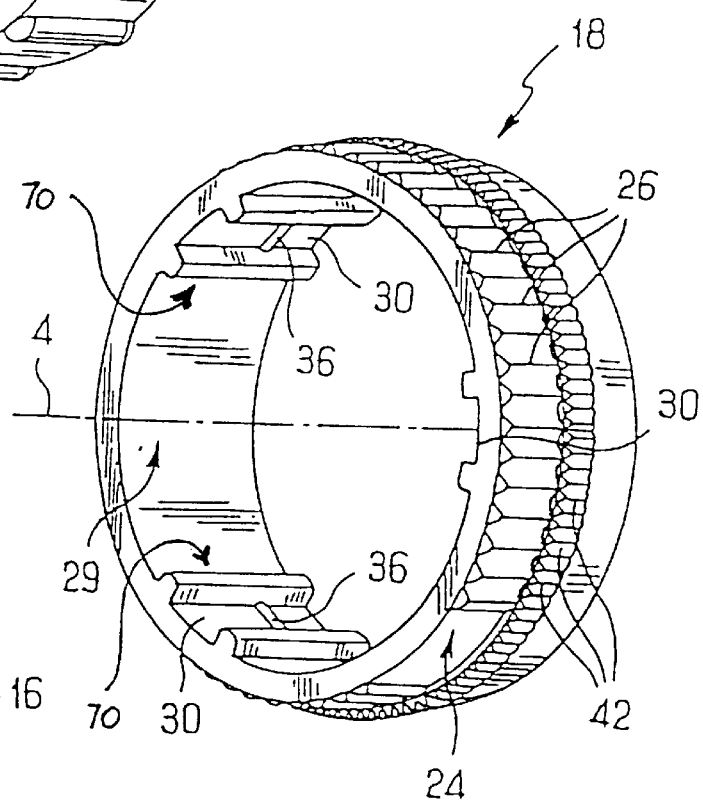
FIG_4
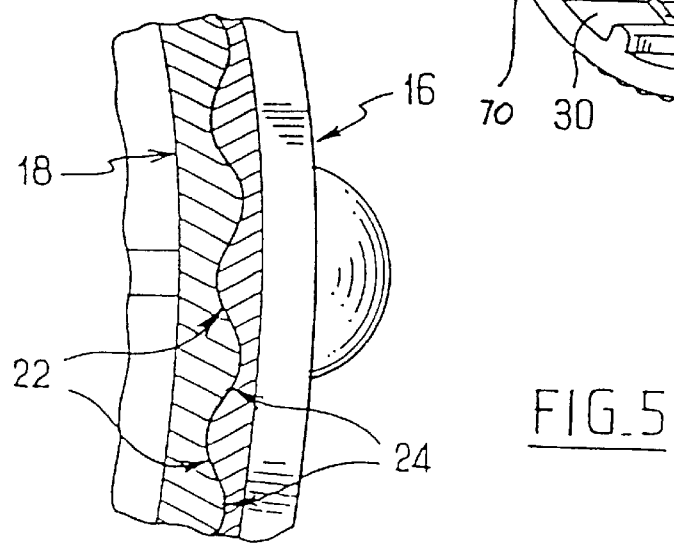
FIG_5

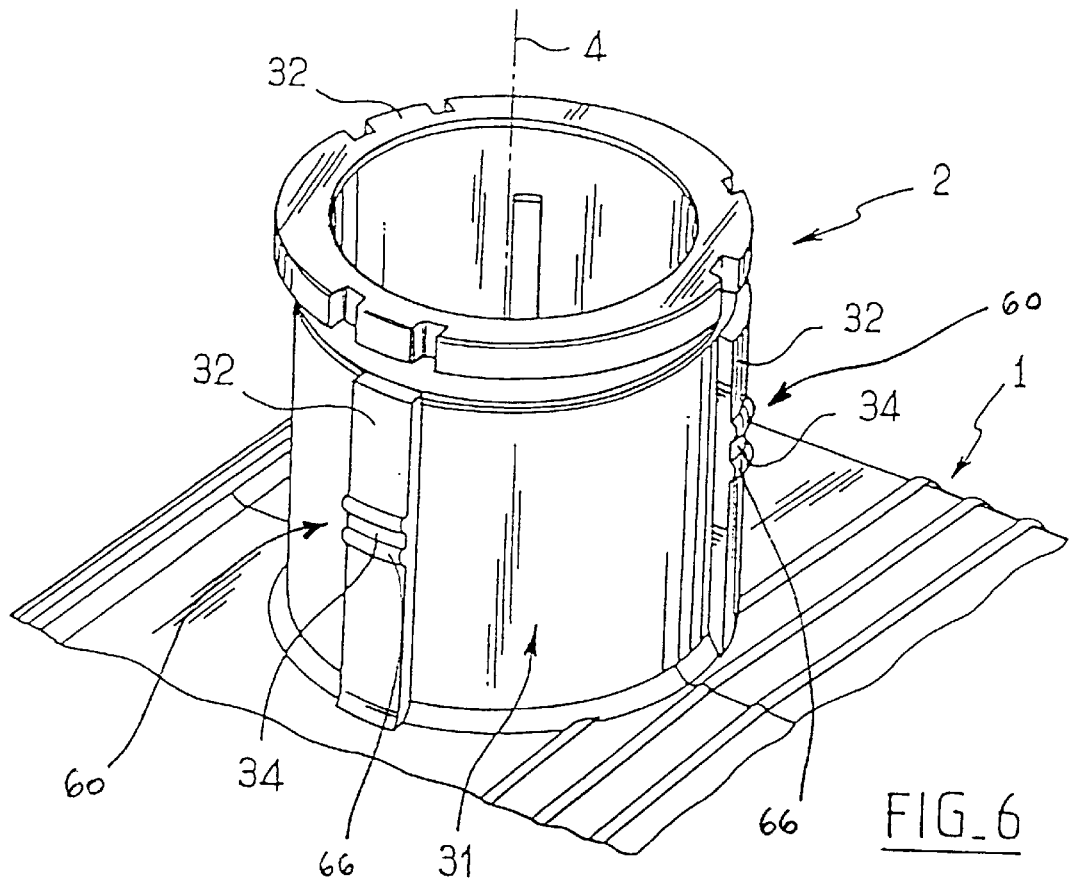
FIG_6
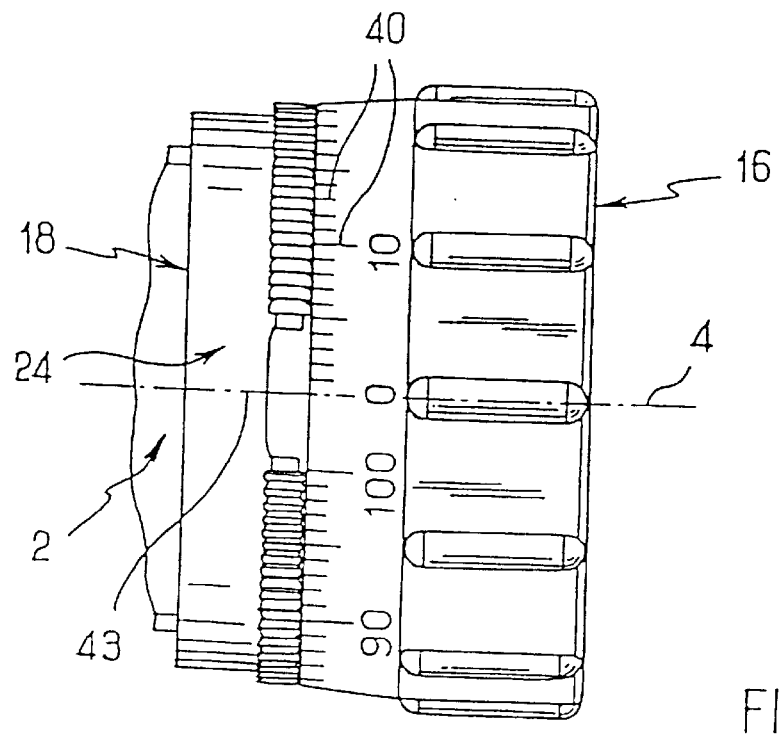
FIG_7

LOCKING DEVICE FOR THE ANGULAR POSITION OF A CONTROL KNOB

TECHNICAL FIELD

The invention relates to devices for controlling the position of a displaceable unit by means of a control knob and in particular, the means which permit secure maintenance of the desired position by locking the corresponding angular position of the knob.

BACKGROUND AND SUMMARY OF THE INVENTION

The field of metering pumps is selected in order to illustrate a nonexclusive area of application of the invention. It is known that, in a metering pump with mechanical control, control of the stroke of the piston or membrane, which provides aspiration and lifting of the fluid and thus control of the pump capacity, depends on the value of eccentricity of a rotary crank which gives rise to alternating movement of a connecting rod which is connected to the piston or membrane. Control of this value is provided by displacement of a movable device, for example, the screw of a screw-nut system, which is maneuvered by means of a rotary knob which is accessible from outside the pump housing and is connected to the stationary nut in translation relative to the housing. In some pumps, the cylinder is controlled by controlling the position of a stop which impedes the aspiration cam of a movable device which is connected to the membrane or piston. This control can be obtained by turning a rotary knob which is accessible from outside the housing. In these devices, there are also locking units for locking the movable assembly in a state which corresponds to the obtained control. In fact, the vibration caused by operation of the pump can give rise to loss of adjustment of the position of the movable assembly and thus give rise to loss of adjustment of the capacity value.

An object of the invention is to provide a device for simple locking of a control knob, in particular, of a system for controlling the capacity of a pump, and in particular, of a metering pump.

Thus, for this purpose, the object of the invention is to provide a device for locking the angular position of a control knob of a movable device which is mounted rotatably at the end of a substantially cylindrical support. The knob comprises a lateral face which is parallel to the axis of the cylindrical support. The locking device comprises a ring which is mounted so that it can slide along the support between a first position removed from the knob and a second position close to the knob. The ring is prevented from rotating relative to the support, at least in this second position. The lateral face comprises bosses which are arranged so that, in its second position, corresponding bosses of the ring engage with bosses of the lateral face of the knob for each of the positions of a plurality of specific angular positions of the knob.

In the locked position, the ring prevents loss of adjustment of the device, whereas, in the released position, it allows control to be carried out freely. Translational displacement of the ring between the two positions provides fast and simple locking and unlocking of the knob.

In practice, the bosses consist of serrations, applied to the lateral face of the knob which is cylindrical, and of corresponding serrations applied to the ring. The serrations are engaged axially with one another in the second position of the ring for the plurality of angular positions of the knob.

In addition, between the support and the ring, the device comprises means for locking the ring relative to the support in the second position of the ring.

This locking of the ring ensures that the knob remains locked. The ring is thus prevented from being displaced by the effect of vibration or impact, or by the effect of gravity, if the arrangement of the device is such that the locked position is at a high position of the ring and the released position is at a low position, so that the gravity would tend to unlock the knob.

DESCRIPTION OF THE DRAWINGS

Other features and advantages of the invention will become apparent from the following description of the preferred embodiments. The following are shown in the attached drawings, which are provided by way of a nonlimiting example:

FIG. 1 is a cross-section according to a vertical median plane of a device for controlling the stroke of the movable device of a motor-driven pump unit provided with the locking device according to the invention, shown in the locked state;

FIG. 2 is a view on a larger scale of the locking device in FIG. 1, shown this time in its unlocked state;

FIGS. 3 and 4 are perspective views of the knob and ring of FIGS. 1 and 2;

FIG. 5 is a cross-section of the device according to plane V—V of FIG. 1;

FIG. 6 is a perspective view of a portion of the housing of FIG. 1; and

FIG. 7 is a plan view of the locking device of FIG. 1.

DESCRIPTION OF THE DRAWINGS

The device shown in FIG. 1 comprises a housing 1, a part 2 of which is cylindrical with axis 4. A mechanism 3, for controlling the pump capacity, is located in the housing and comprises an end 6, which is movable along axis 4, the movement and stoppage of which are controlled by nut 12, which is prevented from rotating in cylindrical part 2 of housing 1 and cooperates with screw 14 which cannot perform a translational movement but can rotate around axis 4, in order to form a screw-nut system which is located in cylindrical part 2 of housing 1. Cylindrical knob 16 is fixed on screw 14 and thus rotates at the end of its support, which forms cylindrical portion 2 of housing 1 around axis 4 and is also the central axis of knob 16. Rotation of knob 16 rotates screw 14, which results in an axial displacement of nut 12 and of the mechanism for control of the capacity, which is connected to it by end 6. In this case, knob 16 is in the form of a cap which covers the end of part 2 of the housing and has a skirt which surrounds this part on the exterior.

By way of a nonlimiting example, with reference to FIG. 1, a brief description will be given of the mechanism for control of the capacity of a pump, that is, for control of the alternating path stroke.

Housing 1 is covered by base 101 of motor 102, an output shaft 103 of which carries an endless screw, which cannot be seen in the Figure. This screw cooperates with toothed wheel 104, which is mounted rotatably on shaft 105 with axis 4. This wheel 104 is coupled in rotation to cam 106 on which foot 107 of a connecting rod is mounted rotatably. The head of the rod is joined to the movable wall of a pump work chamber, which is not shown. The coupling of this cam to toothed wheel 104 makes it possible to control the value of the eccentricity in a known manner and thus the stroke of the head of the connecting rod and consequently the capacity of the pump.

The mechanism for controlling the value of the eccentricity comprises cam 108 which rotates together with cam 106. The position of which along shaft 105 is adjustable by a device consisting of nut 12, which carries bearing 110 attached for translation at end 6 of cam 108. The latter is able to rotate in this bearing 110. Rotation of nut 12 in tubular part 2 of housing 1 is prevented, and can be displaced along axis 4 by means of screw 14, which is firmly attached to knob 16. Thus, the shorter the distance from cam 108 to wheel 104, the greater the value of eccentricity of cam 106 and greater the pump capacity (all other aspects remaining the same).

On the exterior of cylindrical part 2, the device also comprises coaxial ring 18 outside housing 1. Inner lateral face 20 of the skirt of knob 16 has a series of first locking bosses consisting of serrations 22, which are parallel to axis 4. An outer lateral face 24 of ring 18 has a series of second locking bosses consisting of serrations 26 which are parallel to axis 4. In the Figure, serrations 22 of the knob cover an angular sector of 51.2° and serrations 26 of the ring cover an angular sector of 327.64°. Each serration 22, 26 occupies an angular sector of 6.24°. These values are determined in relation with the kinematics of the control mechanism for controlling the capacity, so that the rotation of the knob, at an angular value equal to one serration, corresponds to a variation of 2% of the pump capacity.

In this case, knob 16 is movable here correspondingly, over slightly less than a full rotation. Stops, which are not shown, limit its rotation in each direction.

Considering the angular dimension selected for each serration 22, 26, the periphery of ring 18 cannot have an integer number of serrations 26. Therefore, the ring 18 has a smooth section which contains no serrations. For the same reason, the serrated area of knob 16 cannot engage simultaneously with the two ends of the serrated section of the ring 18. The angular values of the serrated section of knob 16 and the smooth section of ring 18 have thus been selected according to the position of the aforementioned stops, in order to prevent the serrated section of the knob 16 from being positioned opposite the two ends of the serrated section of the ring 18 simultaneously. Naturally, these serrations can be produced so that they are symmetrical. That is, with the large serrated section carried by the knob 16, and the small serrated section carried by the ring 18.

Ring 18 is mounted slidingly along portion 2 of housing 1 between a position where the rotation of knob 16 is locked such that the end skirt of the knob 16 covers a portion of the ring and first serrations 22 and second serrations 26 are engaged, as can be seen in FIGS. 1 and 5, and in an unlocked position away from the knob 16 in which the first and second serrations 22, 26 are decoupled.

Ring 18 is prevented from rotating around axis 4. For this purpose, an inner lateral face 29 of ring 18 has three grooves 30 which are parallel to axis 4, which are 120° apart from one another and can be seen in FIG. 4. Cylindrical surface 31 of part 2 of housing 1 has three ribs 32 which are parallel to axis 4 and cooperate with grooves 30 in order to permit translation of the ring 18 parallel to axis 4, while preventing its rotation. Thus, in the locked position, ring 18 prevents rotation of knob 16. Ring 18 can be prevented from rotating in a variant which is not shown, by a single groove such as 30 and a single rib such as 32. Guiding of the ring 18 relative to cylindrical face 31 is then improved by simple longitudinal ribs, inside the ring 18 or projecting on face 31.

The control device also comprises retention means for ring 18, which prevent translation of the ring 18 from the locked position. These retention means consist of three first retention bosses 60 carried by outer lateral face 31 of the housing 1. Each consists of notch 34, which is delimited between two elongated bosses 66, 68, which extend transversely on rib 32. The retention means also consist of three second retention bosses 70 carried by inner lateral face 29 of the ring 18, which include three elongated bosses 36 which extend transversely in respective grooves 30. Notches 34 and bosses 36 are arranged so that they can engage with one another in the locked position according to FIG. 1, with each boss 36 located in the corresponding notch 34. They can be decoupled from one another in the unlocked position, according to FIG. 2, so that each boss 36 is outside the corresponding notch 34. The dimensions of the bosses 36 and notches 34 are such that a user needs to apply slight force in order to engage or disengage them, by elastic deformation of the ring 18, which permits them to be snapped together.

In the released position, as shown in FIG. 2, the knob 16 can be rotated in order to control the relative position of nut 12 and screw 14, and thus of cam 108. In the locked position, as shown in FIG. 1, the retention bosses lock the ring in position and the locking bosses 22, 26 lock the knob 16 in position.

With reference to FIG. 7, the device comprises means for determining the angular position of knob 16 around axis 4 relative to ring 18 and housing 1. These means comprise a set of graduations 40 on the outer lateral face of knob 16 in the vicinity of its free end and an indicator 43 on outer lateral face 24 of the ring 18. The set of graduations 40 and indicator 43 are arranged so that they are adjacent in the locked position. The reference means allow the user to quantify control of the pump capacity easily. According to another embodiment, indicator 43 can be replaced by a second set of graduations, so that the two series of graduations constitute a vernier.

Naturally, numerous modifications can be made to the invention without departing from its scope, as defined in the attached claims.

In some cases, it is sufficient for the ring and/or knob to each have a single locking boss, for example, if the elementary displacement step of the screw-nut system corresponds to a full rotation of the knob. The locking and retention bosses can have various forms other than serrations and bosses. A device can be produced in which the ring can rotate in the released position, since immobility of the ring to lock the handle is necessary only in the locked position. The first retention boss can be carried by the knob. The device can be such that the ring covers a portion of the handle in the locked position. In this case, the bosses are carried on the outer face of the knob and the inner face of the ring. The control device can form part of installations other than a metering pump.

In the example described, the knob is arranged on the end of the support and the locking ring slides on the support. It is not outside the scope of the invention if the knob is in the form of a rotary ring and the ring is an end sleeve beyond the rotary ring on the support in the form of a cap which can be displaced axially between the two positions.

I claim:

1. An angular position locking device rotatably mounted at an end of a substantially cylindrical support of a movable device, the locking device comprising:

a knob including a lateral face parallel to an axis of the cylindrical support and provided with a first set of bosses; and a ring mounted for sliding along the support between a first position removed from the knob and a second position close to the knob, the ring being prevented from rotating relative to the support at least in the second position, the ring provided with a second set of bosses for cooperating with the first set of bosses on the lateral face of the knob, wherein the first set of bosses includes serrations carried by the lateral face of the knob on an angular section of a periphery of the knob and the second set of bosses includes corresponding serrations carried by the ring on a section of a periphery of the ring, the serrations being engaged axially with one another in the second position of the ring.

2. The locking device of claim 1 further including, between the support and the ring, means for locking the ring with respect to the support in the second position of the ring.

3. The locking device of claim 2 further comprising means for determining the angular position of knob around the axis relative to the ring, the means comprising a set of graduations carried by an outer face of the knob and an indicator carried by an outer face of the ring, wherein the graduations and the indicator are arranged adjacently in the second position.

4. The locking device of claim 3 wherein an outer face of the support comprises at least one longitudinal boss which cooperates with a corresponding boss of the ring to prevent the latter from rotating relative to the support.

5. The locking device of claim 2 wherein an outer face of the support comprises at least one longitudinal boss which cooperates with a corresponding boss of the ring to prevent the latter from rotating relative to the support.

6. The locking device of claim 1 further comprising means for determining the angular position of knob around the axis relative to the ring, the means comprising a set of graduations carried by an outer face of the knob and an indicator carried by an outer face of the ring, wherein the graduations and the indicator are arranged adjacently in the second position.

7. The locking device of claim 6 wherein an outer face of the support comprises at least one longitudinal boss which cooperates with a corresponding boss of the ring to prevent the latter from rotating relative to the support.

8. The locking device of claim 1 wherein an outer face of the support comprises at least one longitudinal boss which cooperates with a corresponding boss of the ring to prevent the latter from rotating relative to the support.

\* \* \* \* \*